(12) United States Patent
Morimoto et al.

(10) Patent No.: US 6,317,687 B1
(45) Date of Patent: Nov. 13, 2001

(54) VEHICLE NAVIGATION APPARATUS PROVIDING BOTH AUTOMATIC GUIDANCE AND GUIDANCE INFORMATION IN RESPONSE TO MANUAL INPUT REQUEST

(75) Inventors: Kyoumi Morimoto, Nishio; Naokazu Ozaki, Hazu-Gun; Kiyohide Kato, Chiryu; Naoko Sugiura, Toyota, all of (JP)

(73) Assignee: Aisin Aw Co., Ltd. (JP)

( * ) Notice: Subject to any disclaimer, the term of this patent is extended or adjusted under 35 U.S.C. 154(b) by 0 days.

(21) Appl. No.: 08/030,481

(22) PCT Filed: Oct. 5, 1992

(86) PCT No.: PCT/JP92/01293

§ 371 Date: Mar. 15, 1993

§ 102(e) Date: Mar. 15, 1993

(87) PCT Pub. No.: WO93/07447

PCT Pub. Date: Apr. 15, 1993

(30) Foreign Application Priority Data

Oct. 4, 1991 (JP) .................................................. 3-258172
Aug. 19, 1992 (JP) .................................................. 4-220109

(51) Int. Cl.$^7$ .................................................. G01C 21/00
(52) U.S. Cl. .......................................... 701/211; 701/201
(58) Field of Search .................................. 364/443, 444, 364/449, 449.5, 444.1; 340/996; 381/86

(56) References Cited

U.S. PATENT DOCUMENTS

| 4,679,147 | 7/1987 | Tsujii et al. | 364/449 |
| 4,758,959 | 7/1988 | Thoone et al. | 364/454 |
| 4,812,845 | 3/1989 | Yamada et al. | 340/995 |
| 4,882,696 | 11/1989 | Nimura et al. | 364/449 |
| 4,937,751 | 6/1990 | Nimura et al. | 364/449 |
| 4,954,959 | 9/1990 | Moroto et al. | 364/449 |
| 5,121,326 | 6/1992 | Moroto et al. | 364/449 |
| 5,122,961 | 6/1992 | Toyama et al. | 364/449 |
| 5,177,685 | * 1/1993 | Davis et al. | 364/443 |
| 5,220,507 | * 6/1993 | Kirson | 364/444 |

FOREIGN PATENT DOCUMENTS 9118345   11/1991   (WO).

* cited by examiner

Primary Examiner—Michael Zanelli
(74) Attorney, Agent, or Firm—Lorusso & Loud (57) ABSTRACT

A vehicle navigation apparatus in accordance with the present invention includes a CDROM (2) for storing all the data required for navigation processing such as maps and voice data, and a buffer (4-1) for accessing CDROM (2) to prepare beforehand a phrase necessary for the navigation guidance. A control device (1) selects appropriate phrases corresponding to the present vehicle position and reads out the selected phrases from the buffer, (4-1) successively, in response to a request signal supplied from a request sensor (7) which is output in response to the driver's request. The thus processed navigation information data is transformed into voice signals through a decoder (4-2) and output from a speaker (5) as a voice response. The control device (1) checks whether or not a phrase prepared in the buffer (4-1) is a frequently used phrase and replaces this phrase with a new phrase if this phrase is not frequently used. Furthermore, the control device (1) sets discriminating flags to the selected phrases and continuously reads out these phrases with the discriminating flags, in a predetermined order, in accordance with the driver's request, so as to execute voice response processing.

26 Claims, 10 Drawing Sheets

FIG. 1

| voice data categories | voice data content |
|---|---|
| voice segment | pop<br>intersection<br>300m from here<br>turn right    etc |
| intersection name | Fujii – cho<br>Ishii – cho<br>Toyo – cho          etc |
| mark name | municipal office<br>art museum<br>bank            etc |
| road name | route No.1<br>Iida road<br>Chiryu bypass      etc |
| destination point name | Okazaki IC<br>"A" country club<br>Aisin AW (front gate)   etc |

FIG. 5 content of buffer

| pop | approximately 400m | |

| pop | approximately 400m | at Fujii-cho | |

| pop | ↑ | ↑ | turn right | |

| pop | ↑ | | | |

→ voice guidance output

| No | voice data | f | n |
|---|---|---|---|
| 1 | approximately 100m from here | 0 | 1 |
| 2 | approximately 400m from here | 0 | 1 |
| 3 | pop | 0 | 1 |
| ⋮ | ⋮ | ⋮ | ⋮ |
| 19 | turn right | 0 | 1 |
| 20 | turn left | 0 | 1 |

FIG. 9(b)

| No | voice data | f | n |
|---|---|---|---|
| 1 | approximately 100m from here | 0 | 1 |
| 2 | approximately 400m from here | 1 | 2 |
| 3 | pop | 1 | 2 |
| ⋮ | ⋮ | ⋮ | ⋮ |
| 19 | turn right | 1 | 2 |
| 20 | turn left | 0 | 1 |

FIG. 9(c)

| No | voice data | f | n |
|---|---|---|---|
| 1 | approximately 100m from here | 0 | 1 |
| 2 | approximately 400m from here | 1 | 2 |
| 3 | pop | 1 | 2 |
| ⋮ | ⋮ | ⋮ | ⋮ |
| 19 | turn right | 1 | 2 |
| 20 | | | |

| No | voice data | f | n |
|---|---|---|---|
| 1 | approximately 100m from here | 0 | 1 |
| 2 | approximately 400m from here | 1 | 2 |
| 3 | pop | 1 | 2 |
| ⋮ | ⋮ | ⋮ | ⋮ |
| 19 | turn right | 1 | 2 |
| 20 | Fujii—cho | 1 | 1 |

FIG. 9(d)

| ※ | No | voice data | f | n |
|---|---|---|---|---|
|  | 1 | approximately 100m from here | 0 | 1 |
|  | 2 | approximately 400m from here | 1 | 2 |
| 1 | 3 | pop | 1 | 2 |
|  | ⋮ | ⋮ | ⋮ | ⋮ |
| 3 | 19 | turn right | 1 | 2 |
| 2 | 20 | Fujii—cho | 1 | 1 |

※ : selection order

FIG. 9(e)

| ※ | No | voice data | f | n |
|---|---|---|---|---|
| 2 | 1 | approximately 100m from here | 0 | 1 |
|  | 2 | approximately 400m from here | 1 | 2 |
| 1 | 3 | pop | 1 | 2 |
|  | ⋮ | ⋮ | ⋮ | ⋮ |
| 4 | 19 | turn right | 1 | 2 |
| 3 | 20 | Fujii—cho | 1 | 1 |

※ : selection order

FIG. 9(f)

VEHICLE NAVIGATION APPARATUS PROVIDING BOTH AUTOMATIC GUIDANCE AND GUIDANCE INFORMATION IN RESPONSE TO MANUAL INPUT REQUEST

BACKGROUND OF THE INVENTION

1. Field of the Invention

The present invention relates to a vehicle navigation apparatus which is capable of executing voice and/or screen display guidance for navigating a vehicle to a destination point as the vehicle is driven.

2. Description of the Prior Art

A conventional vehicle navigation apparatus, for example, disclosed in Laid-open Japanese Patent Application No. SHO 60-202307, is operated in such a manner that, when it is detected that the vehicle has reached a designated specific area in an intersection, the navigation apparatus notifies the correct direction in which the vehicle should next proceed after passing this intersection, by means of voice and/or display guidance. Another conventional vehicle navigation apparatus, for example, disclosed in Laid-open Japanese Patent Application No. SHO 63-21199, provides voice guidance after the vehicle has run a predetermined distance past an intersection.

However, in these conventional navigation systems, the navigation guidance is issued punctually in accordance with a predetermined procedure, along a predetermined route, without regard for whether or not the driver wants such information. Accordingly, these conventional systems are limited in that the navigation guidance is not always provided when the driver wants For example, where navigation guidance is only given concerning an immediate next— approaching intersection, until the vehicle has completely passed that one intersection, the driver cannot obtain information for the intersection succeeding this immediate next—approaching intersection, or a target, before the vehicle passes that one intersection. Therefore, it was difficult to obtain oncoming information sufficiently beforehand to ensure driving safety.

Furthermore, as the navigation guidance is automatically provided every time the vehicle has run a predetermined distance or every time a predetermined time has elapsed, the driver may come to regard such information as a nuisance because the driver hears it even when he does not want it.

Thus, the conventional navigation apparatus is characterized in that it gives the driver navigation information without taking into account the driver's desire or lack of desire for such information. Therefore, there was the inconvenience that the navigation information was not obtained timely, even if the driver wanted to know it.

Furthermore, as numerous data such as that for maps, voice responses and so on is concentrated and stored in the same CDROM it takes a long time to access the required data. Especially, in the case where two successive items of guidance information are issued during a limited time over a short vehicle travel distance, the vehicle may proceed a significant distance while the necessary data is accessed in the massive CDROM and therefore the navigation guidance may not be given to the driver until the vehicle has reached the immediate area before the next target point. Thus, the driver may be forced to suddenly brake or steer the vehicle to change the course in accordance with the given guidance information, endangering driving safety.

That is, the conventional navigation apparatus is disadvantageous in that the required information is not always given to a driver when or where he really wants to know it.

SUMMARY OF THE INVENTION

Accordingly, the present invention has as an objective, in view of above-described problems and disadvantages encountered in the prior art, provision of a vehicle navigation apparatus which functions to generate a voice response output of a navigation guidance item of information immediately after the driver requests it.

Another object of the present invention is to provide a vehicle navigation apparatus which is capable of accessing specific voice guidance information in accordance with the driver's request in a short period of time.

In order to accomplish the above objects, the present invention provides a vehicle navigation apparatus, in which navigation guidance is provided along a predetermined route, comprising: memory means for storing various data such as maps and voice data; signal generating means for generating a request signal when navigation guidance is requested by the driver; control means for reading out guidance data, corresponding to a present vehicle position, from said memory means in accordance with said request signal and for processing the read guidance data to obtain navigation guidance information; and a voice generating means for providing voice navigation guidance information to the driver.

The memory means includes a CDROM storing all the necessary data required for navigation guidance and a buffer accessing said CDROM to prepare a phrase necessary for the navigation guidance beforehand. The control means reads out the phrase prepared in the buffer in response to the driver's request.

Moreover, the control means functions to check whether or not a phrase prepared in the buffer is frequently used and to replace this phrase with a new phrase if this phrase is not frequently used.

Further, the control means functions to set discriminating flags to the selected phrases and then to continuously read out these phrases with discriminating flags in a predetermined order in accordance with the driver's request, so as to execute voice response processing.

BRIEF DESCRIPTION OF THE DRAWINGS

FIG. 3(1) shows a screen display of the type which is usually displayed by the navigation apparatus of the present invention and FIG. 3(2) shows a type of screen displayed for a limited period of time when navigation guidance in executed;

FIGS. 9(1), 9(2), 9(3), 9(4), 9(5) and 9(6) are data contents in the buffers, in the voice response processing carried out in the vehicle navigation apparatus in accordance with the second embodiment of the present invention.

DETAILED DESCRIPTION OF THE PREFERRED EMBODIMENT

Figure 1:
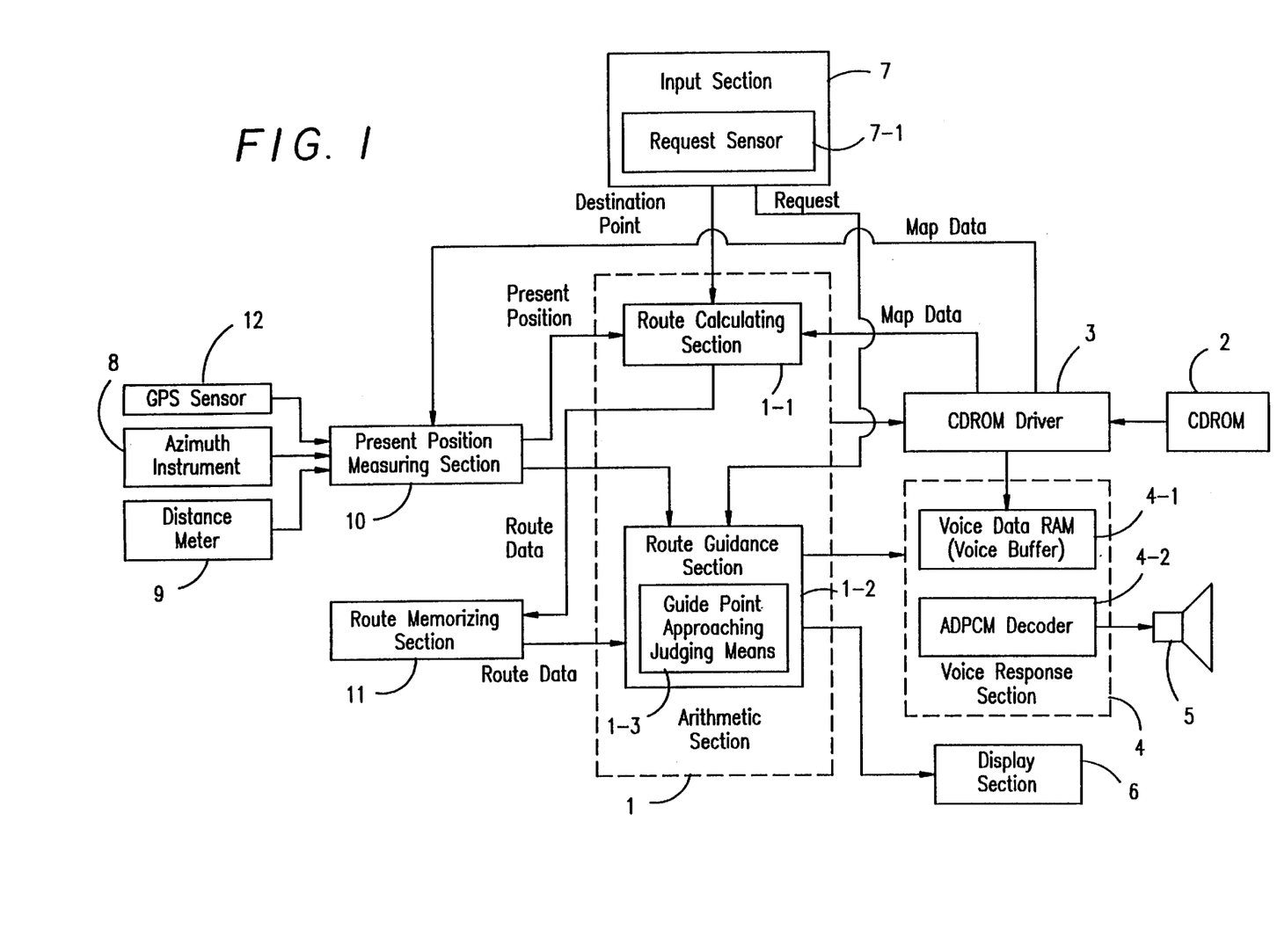
FIG. 1 is a block diagram of an embodiment of a vehicle navigation apparatus in accordance with the present invention.

FIG. 1 shows the hardware of a vehicle navigation apparatus in accordance with the present invention. The present invention provides a navigation apparatus capable of communicating with a driver so as to guide the vehicle properly to a destination point. Namely, during the time the vehicle is being navigated to the destination point, this navigation apparatus can provide guidance information as a voice response, immediately, in response to the driver's request. On the other hand, when the driver does not issue any request, the navigation apparatus provides only automatic voice guidance information with an adequate caution sound when the vehicle passes a predetermined check point such as an intersection.

In this embodiment, the voice phrases to be generated during travel are constructed as a combination of the following four items; (1) a caution sound, (2) distance between the present vehicle position and the target object, (3) the target object, and (4) the direction in which the vehicle should proceed after passing the target object. For example, "pop" may be the phrase representing the above-described caution sound (1), and "approximately 400 m from here", "soon" and the like are used as phrases representative of the above distance from the present vehicle position to the target object (2). Furthermore, "at Fujii-cho", "at a signal", "at an intersection not being equipped with a signal" and the like are used as phrases representative of the above target object (3), and "advance straight", "turn right" and the like are used as phrases representative of the above direction (4).

In FIG. 1, the vehicle navigation apparatus is shown as including an arithmetic section 1 for executing overall control of this system, a CDROM 2 for storing navigation data such as map, target and voice data, a CDROM driver 3 for reading out necessary data from the CDROM 2 in accordance with a command from the arithmetic section 1 and writing it into a voice data RAM 4-1 (hereinafter, referred to as "voice buffer"), a voice response section 4 for transforming the voice data synthesized in the voice buffer 4-1 into a voice signal by an ADPCM decoder 4-2, a speaker 5 connected to the voice response section 4 for generating a guidance voice in accordance with the transformed voice signal, a display section 6 for displaying navigation guidance on a display screen and the like, in response to driver's request, or automatically, an input section 7 for inputting a destination point or requesting the navigation guidance, a present position measuring section 10 for identifying the present position of the vehicle, and a route memorizing section 11 for memorizing the route data in accordance with the destination point.

The arithmetic section 1 includes a route calculating section 1-1 for calculating an appropriate route leading to the destination point, and a route guidance section 1-2 for executing voice guidance and/or display guidance automatically or in response to the driver's request.

The route calculating section 1-1 calculates an appropriate route leading to the destination point on the basis of the following three items of information, i.e., target position information supplied from the input section 7, present position information calculated in the present position measuring section 10, and map information supplied from the CDROM driver 3. Then the thus calculated route data is stored in the route memorizing section 11.

The route guidance section 1-2 includes guide point approaching judging means 1-3 which functions to judge whether or not the present position of the vehicle is approaching a predetermined check point on the route leading to the destination point. Namely, with this function, the timing for providing an automatic voice guidance is determined by detecting when the vehicle reaches a point located a predetermined distance from an intersection on the guide route, or after the vehicle has passed this intersection.

On the basis of this judgement result, appropriate phrases to be used at this guide point, including a caution sound, are selected and stored in the voice buffer 4-1. Subsequently, these selected phrases are transformed into voices and outputted through the ADPCM decoder 4-2.

In this case, the caution sound is output first and, after a predetermined time, for example approximately 0.2 sec, has elapsed, the guidance is next output. At the same time, the present vehicle position on the determined route is displayed in the display section 6.

Furthermore, in the case where a request signal is inputted, the route guidance section 1-2 outputs a command to the voice response section 4 to provide a voice guidance related to the present vehicle position and also outputs a command to the display section 6 to display a map indicating the present position.

Furthermore, it is also possible to construct the system in such a manner that the guidance is displayed in response to the driver's request; i.e. the signal inputted through the input section 7.

The CDROM 2 serves as a data base storing all the data, such as map data, voice data and so on, required for executing the navigation. Among these data, only the voice data are memorized by being compressed using a voice compression method such as ADPCM method.

Figure 2:
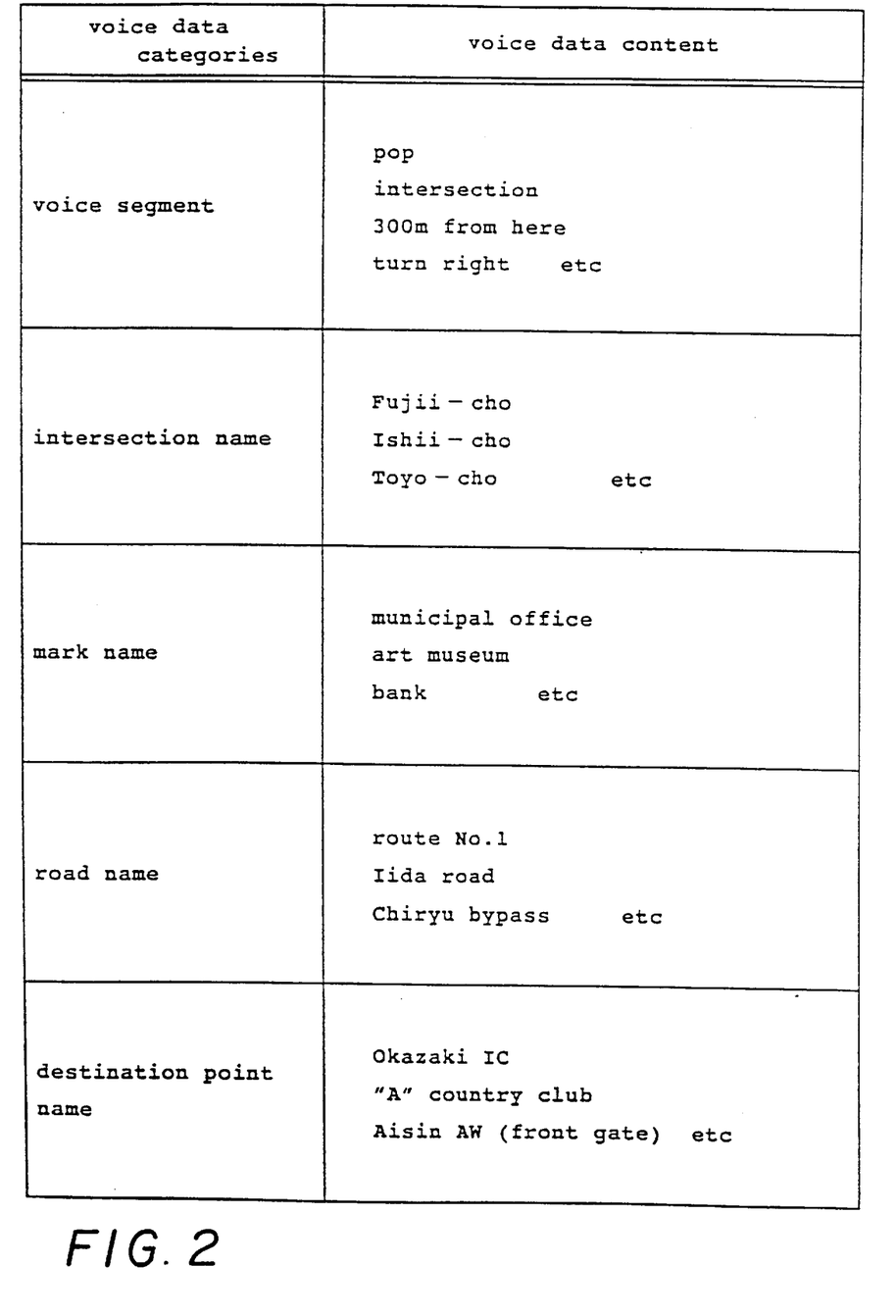
FIG. 2 is a table of one example of voice data recorded in a CDROM.

FIG. 2 shows one example of the voice data content recorded in the CDROM 2. The memorized content is predetermined in accordance with the following data categories: a voice segment, an intersection name, a landmark name, a road name, a destination point name, and the like. For example, "pop", "at intersection", "approximately 300 m from here", etc. might be designated as the voice segment, and "Okazaki IC (interchange)", "A country club", etc. might be designated as the destination point name.

The voice response section 4 synthesizes compressed voices, phrases, unified sentences, sounds and the like and outputs the synthesized result through the speaker 5. The voice data required for giving the guidance information concerning the oncoming landmark point, which is closest to the present vehicle position, is written in succession into the voice buffer 4-1 of this voice response section 4. On the other hand, old voice data not required for this current guidance information is erased in succession, so that new voice data is sufficiently memorized in this voice buffer 4-1. Furthermore, the capacity of this voice buffer 4-1 is dictated by the number of phrases and, for example, is constituted by 20 buffers.

Basic phrases to be synthesized are classified into various categories such as a voice segment, an intersection name, a landmark name, a road name, a target name, etc. Because the arithmetic section 1 can determine present vehicle position on the basis of the route, the travelled distance, and direction of advance, the most preferable phrase combination can be determined from the map data base corresponding to the present vehicle position.

The thus determined phrases are transformed into analogue signals through the ADPCM decoder 4-2, and then issued through the speaker 5 in a form of voice response such as "Approximately 400 m from here", "at Ishikawa-cho", "turn right".

Figure 3A:
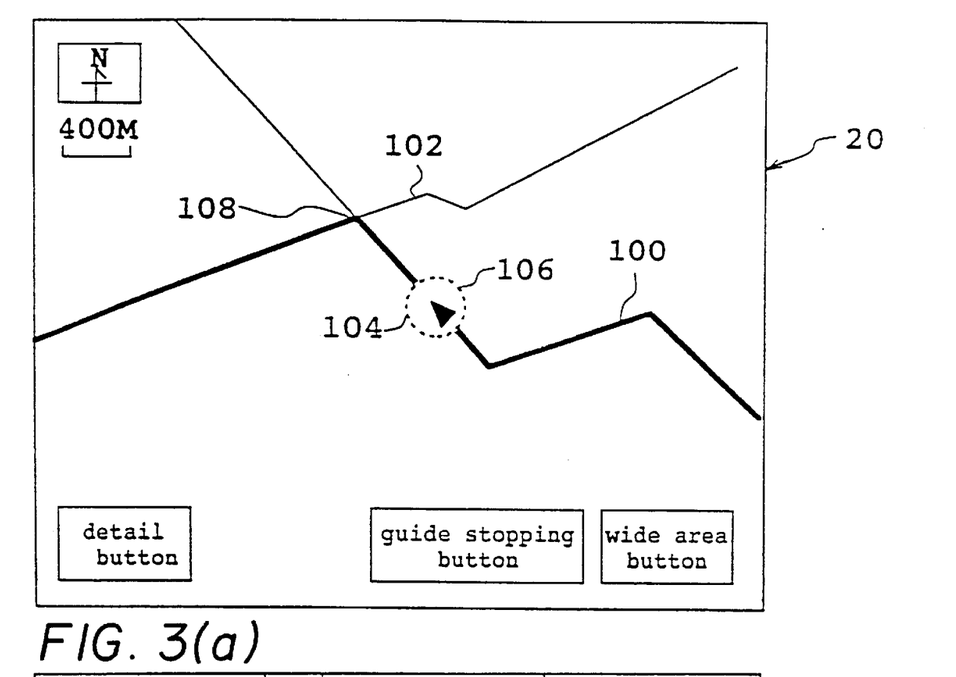
Figure 3B:
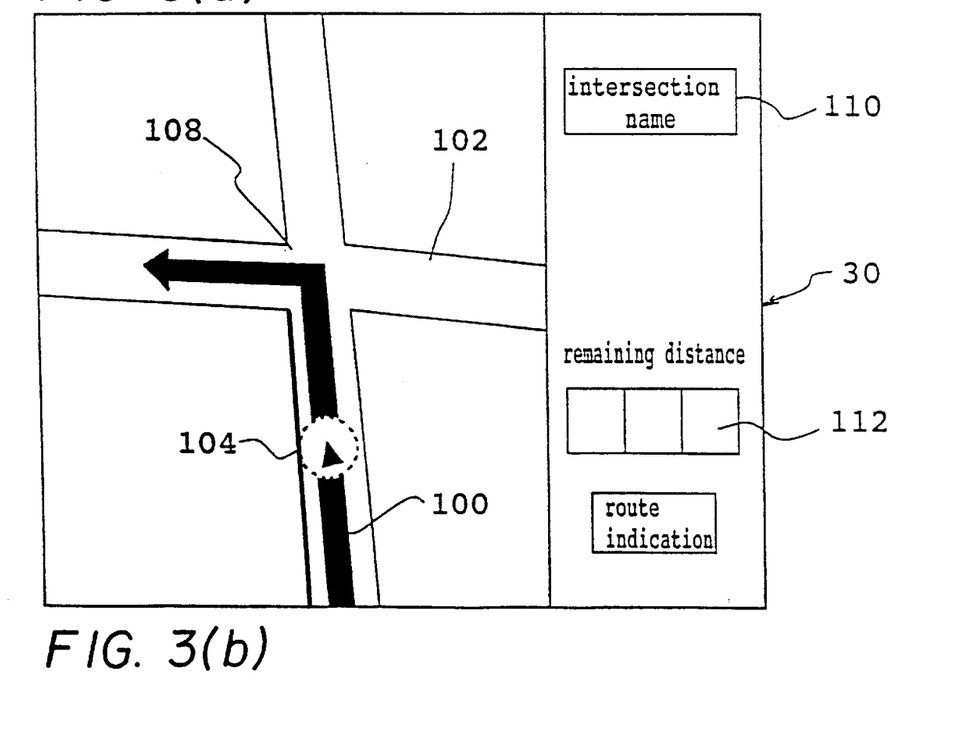

The display section 6 is disposed inside the instrument panel adjacent to the driver's seat, so that a driver can watch the display screen shown, for example, in FIG. 3 to learn the present vehicle position or to obtain information concerning the oncoming route. For example, the selected route may be indicated by a bold line 100 and another road may be indicated by a thin line 102 on the display screen 20 as shown in FIG. 3(1). The present vehicle position is shown by a circle mark 104, and the direction of vehicle advance is shown by an arrow 106. In order to clearly distinguish the respective roads, it is also preferable to provide them with different colors, as well as different line thicknesses.

Furthermore, the above-described screen is provided with several function buttons, which are manipulated for the setting of route guidance and switching of the displayed screen or the guidance used during navigation. That is, the display section 6 is provided with several touch panels which are associated with the displayed buttons, so that above-described operation can be carried out in response to signals inputted through the operation of touching these buttons. These buttons and touch panels constitute an input signal generating device, that serves as a part of the input section 7. However, its detailed explanation is omitted here.

On the display screen (i.e. a section map) 20 there are provided the following three buttons; i.e. a detail button for enlarging the present position and its vicinity, a guide stop button for stopping the guidance, and a wide area button for displaying a wide area including the present position.

When the vehicle approaches an intersection 108 where the vehicle is scheduled to change the route, the display screen is changed to an enlarged display screen 30 as shown in FIG. 3(2). In FIG. 3(2), an intersection name 110 and a distance 112 from the present vehicle position to this intersection are both displayed. Furthermore, upon this display exchange, a guidance voice is issued for providing navigation at this intersection.

In this case, if the time has come for the automatic voice guidance, the voice guidance is issued after a caution sound is once issued. If there is a request from the driver, the voice guidance is issued without any caution sound.

The input section 7 includes a request sensor 7-1, that generates a signal (a trigger) for commanding the navigation processing based on the driver's intent, so that the destination point can be input or the driver can immediately obtain a necessary item of guidance information through the voice and/or screen display when the driver wants it. Moreover, the input section 7 can be constructed such that the destination point is input in response to a designation of the destination point on the display screen in the display section 6.

The present position measuring section 10 acts to identify the present vehicle position on the basis of several items of information, i.e. present vehicle position information received by a GPS receiver 12 that utilizes a satellite navigation system (GPS), direction information obtained from an azimuth instrument 8, travelling distance information obtained from a distance meter 9, and map information obtained from the CDROM driver 3. The thus obtained vehicle present position information is supplied to the arithmetic section 1. The azimuth instrument 8 detects the direction of advance of the vehicle on the basis of the earth's magnetism and the distance meter 9 detects the distance travelled on the basis of the number of rotations of the wheels.

Figure 4:
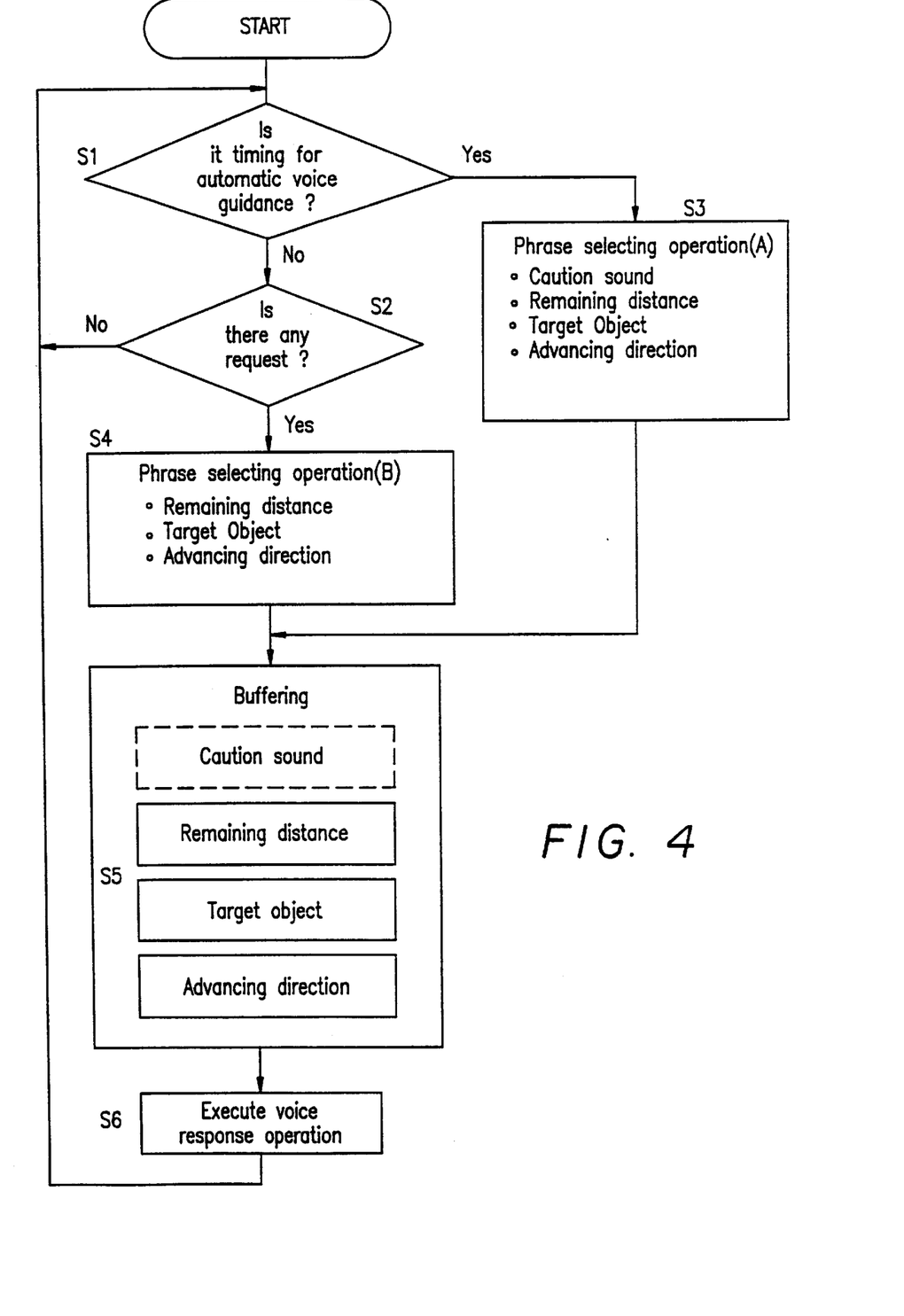
FIG. 4 is a flow chart of a routine for voice response processing carried out in the vehicle navigation apparatus in accordance with a first embodiment of the present invention.
Figure 5:
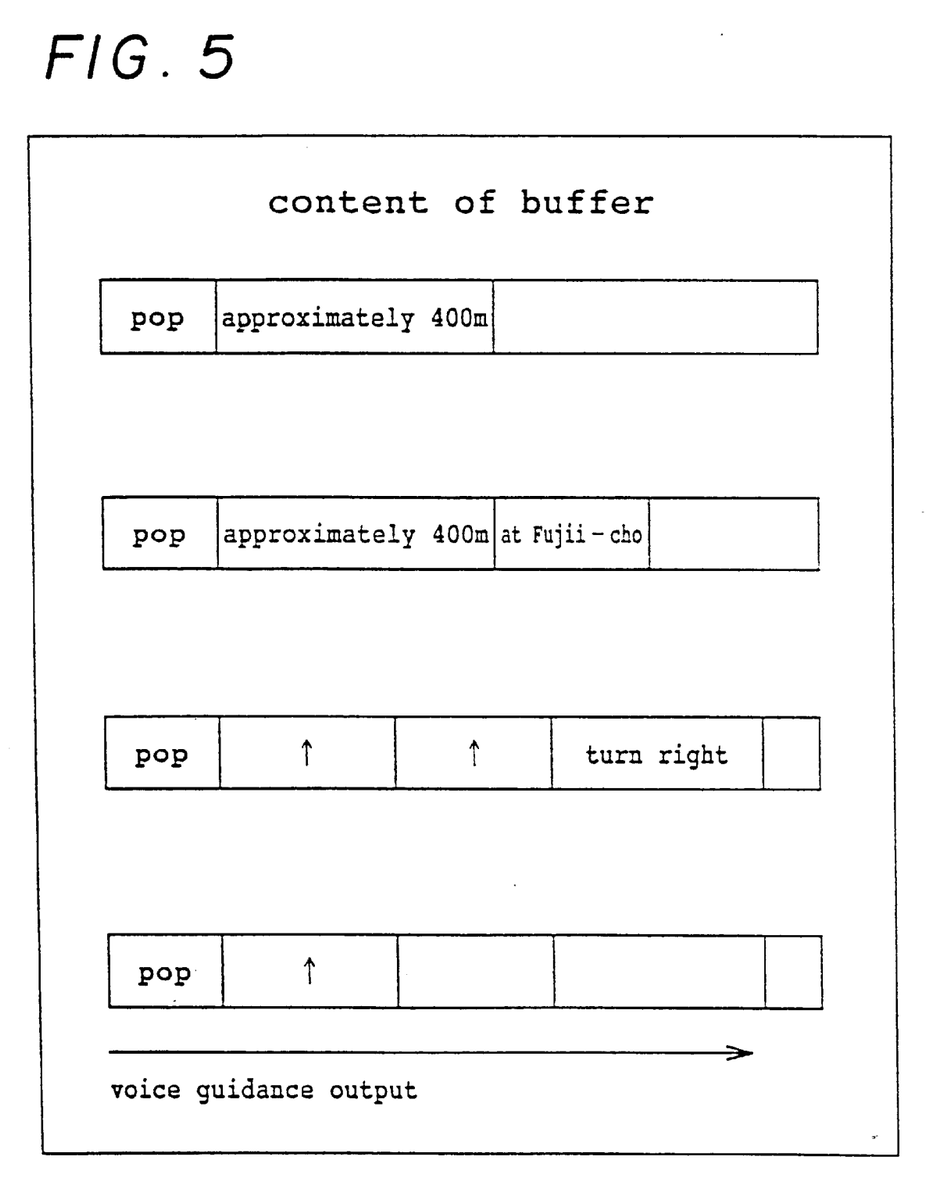
FIG. 5 is a table illustrating the data content in the buffers.

Next, the voice response processing will be explained with reference to FIG. 4 and FIG. 5. In the following explanation, "Approximately 400 m from here" "at Fujii-cho", "turn right" are used as phrases exemplifying items of output guidance information.

When the vehicle is approaching the destination point, the arithmetic section 1 continues to select necessary phrases required for providing guidance information, one after another, on the basis of the present vehicle position.

First of all, it is judged in a step Si whether or not the vehicle is approaching near a predetermined guide point, i.e. it is judged in the step Si whether or not the time has come for the automatic voice guidance. If the judgement in the step Si indicates that the time for the automatic voice guidance has not yet come, it is further judged in step S2 whether or not there is any driver's request.

For example, if arrival at the position indicated in FIG. 3(1) is set as the timing for the automatic voice guidance, a phrase selection (A) is executed in step S3 in such a manner that a phrase is constructed by a caution sound, remaining distance, target object, and direction of advance. Subsequently, a buffering operation is carried out in a step S5 and, in turn, a voice response operation is carried out in a step S6.

At the same time, the display screen is switched to the detail map shown in FIG. 3(2) so as to display an intersection name, a distance from the present vehicle position to the destination point, and the direction in which the vehicle is scheduled to proceed after passing the intersection. When the judgement in the step S2 indicates that the driver has requested guidance information related to a certain place, a phrase selection (B) is executed in step S4 in such a manner that a phrase is constructed by a remaining distance, a target object, and an advancing direction. Subsequently, a buffering operation is carried out in step S5 and, in turn, a voice response operation is carried out in step S6 cancelling any previous voice output operation being conducted.

The buffering operation will be explained with reference to FIG. 5. The CDROM driver 3 basically accesses the CDROM 2 to select phrases and writes them in the voice buffer 4-1. The CDROM driver 3 executes its accessing operation in accordance with a predetermined phrase construction. That is, the caution sound phrase "pop", the remaining distance phrase "approximately 400 m from here", the target object phrase "at Fujii-cho", and the advancing direction phrase "turn right", are accessed successively. These phrases are written in the voice buffer 4-1.

When all the phrases constituting the guidance information to be issued as the automatic voice response or as the voice response in accordance with the driver's request have been buffered in this manner, the voice response processing is carried out to transform these buffered phrases into voice signals through the ADPCM decoder 4-2.

Next, a second embodiment of the navigation apparatus in accordance with the present invention will be explained. Though the voice response processing in the above-described embodiment is carried out in such a manner that the CDROM 2 is accessed with respect to all of these three or four phrases and then their voice data are buffered, this embodiment is different from this above-described embodiment in that the voice response is given immediately to the driver in accordance with the timing of automatic voice response or in response to the driver's request without accessing the CDROM 2.

Figure 6:
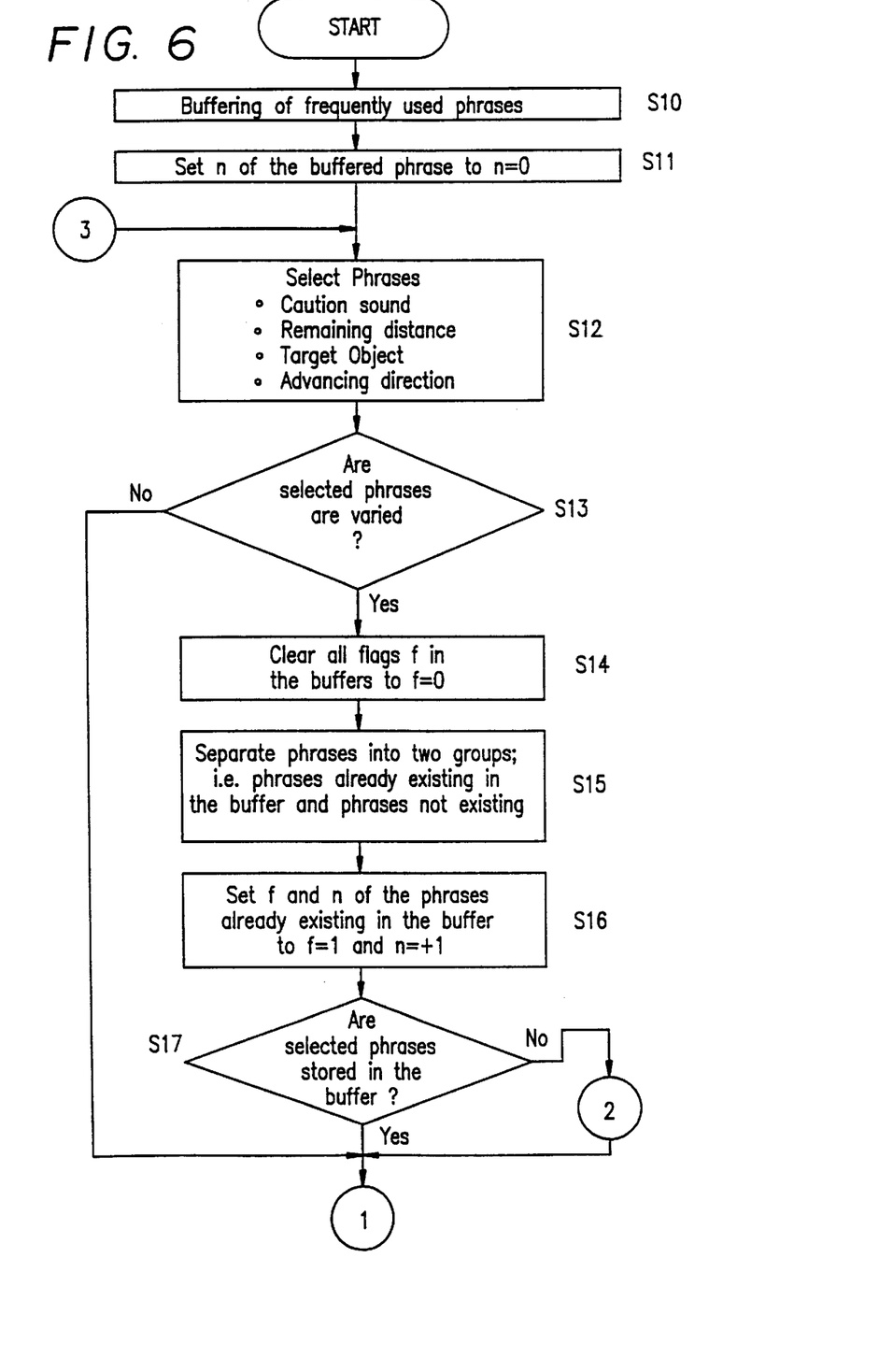
FIG. 6 is a flow chart of a routine for voice response processing carried out in the vehicle navigation apparatus in accordance with a second embodiment of the present invention.
Figure 7:
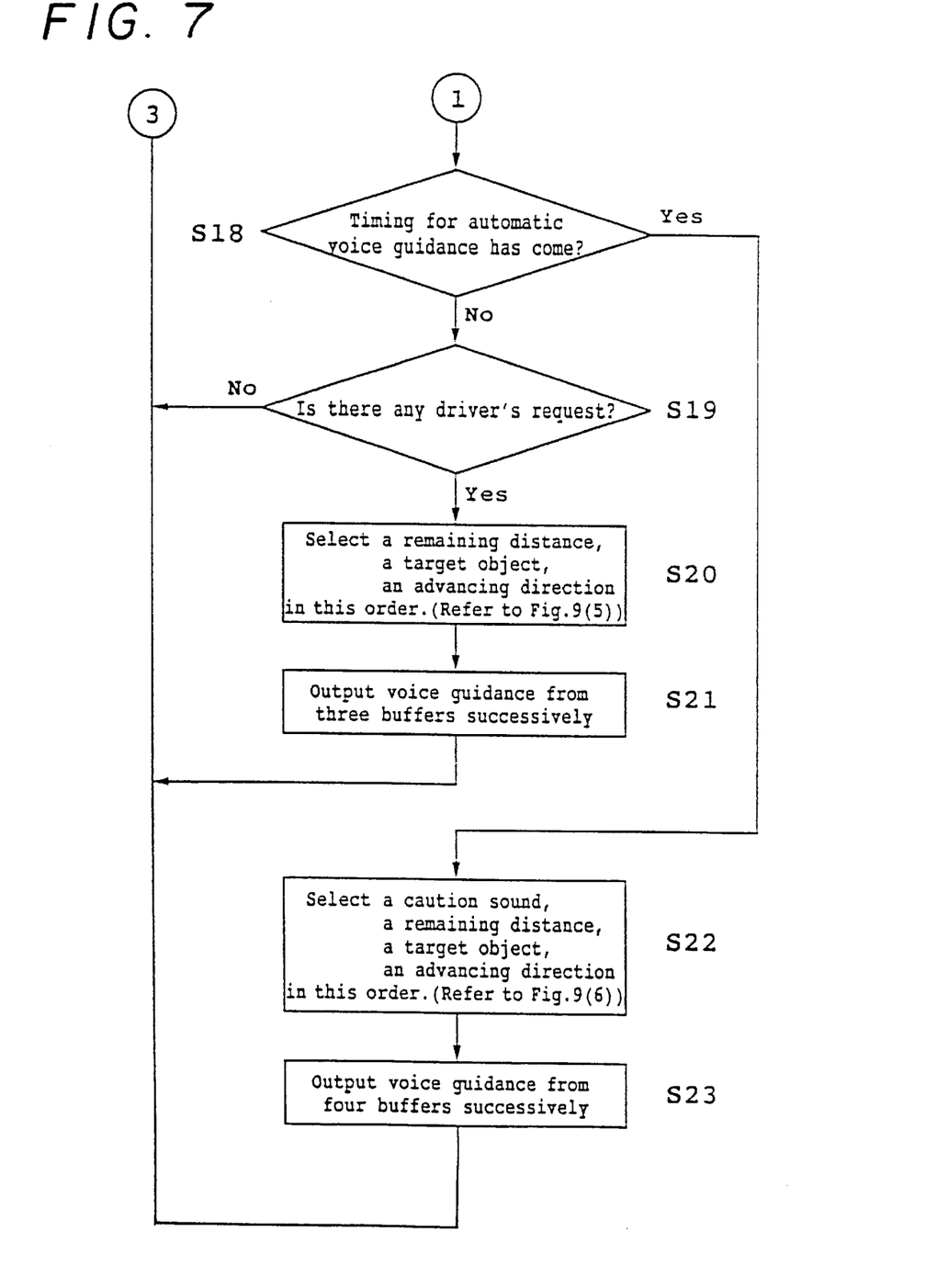
FIGS. 7 and 8 are flow charts showing the remainder of the flow chart shown in FIG. 6.
Figure 8:
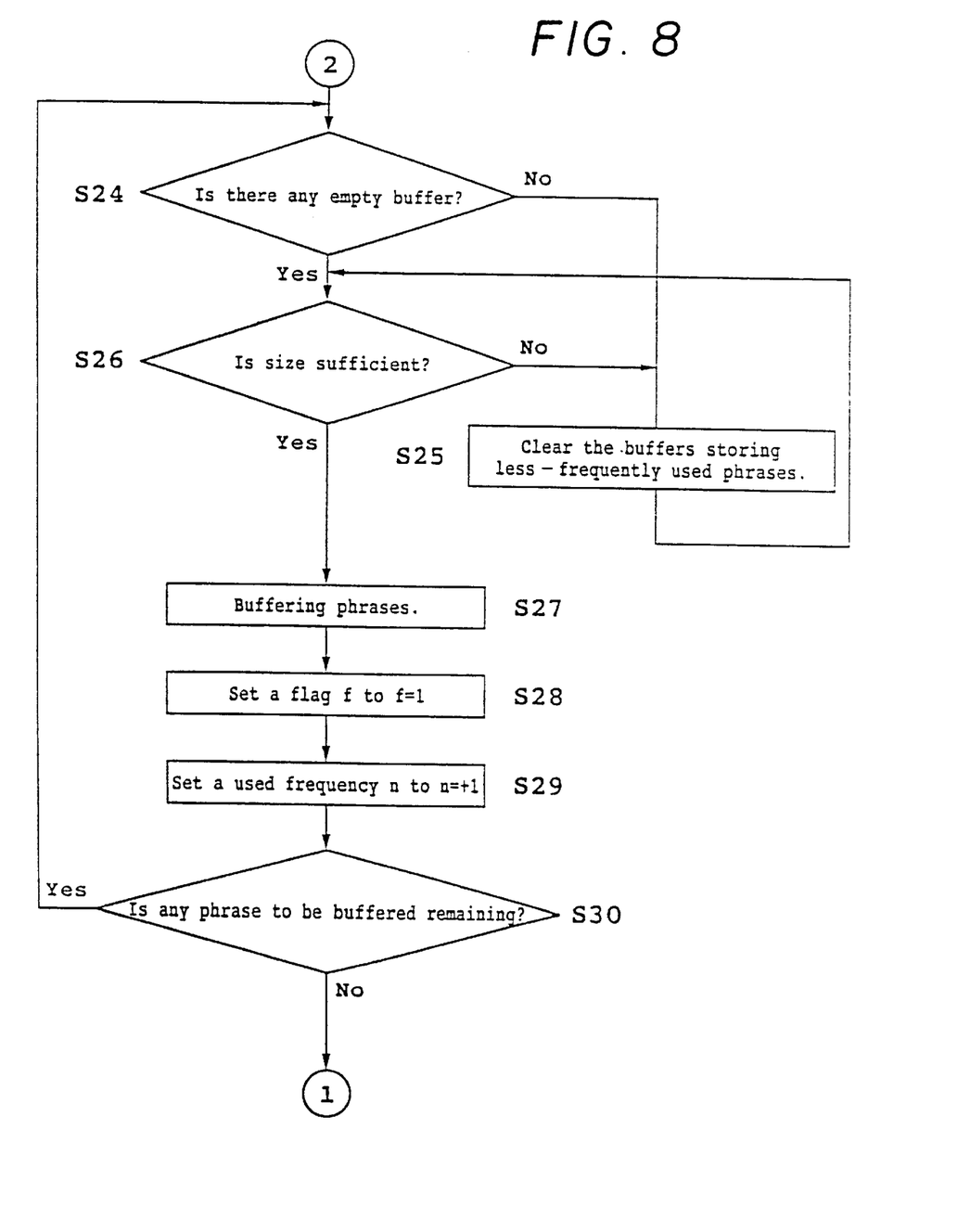
Figure 9A:
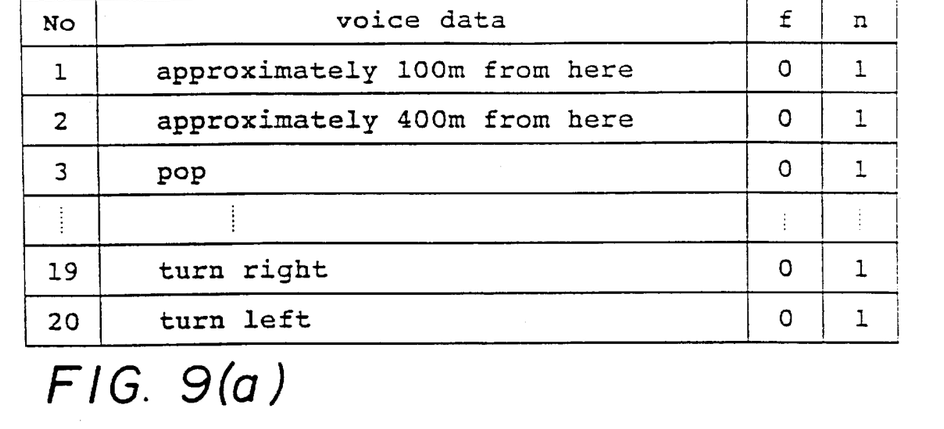
Figure 9B:
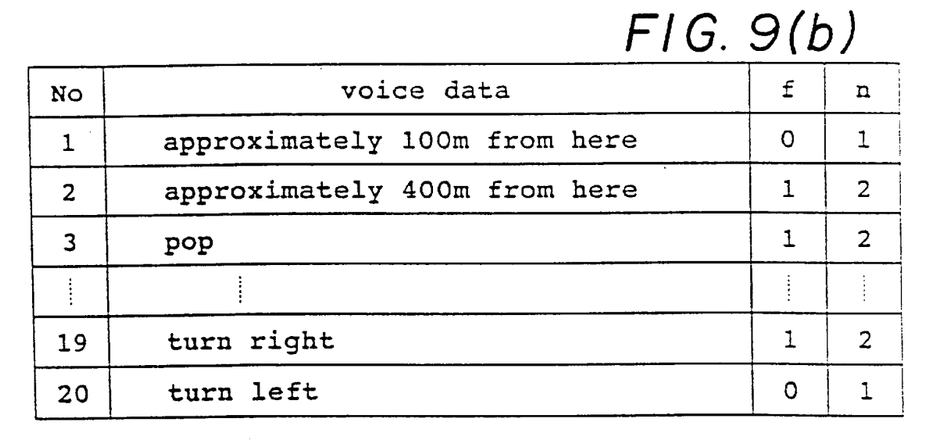
Figure 9C:
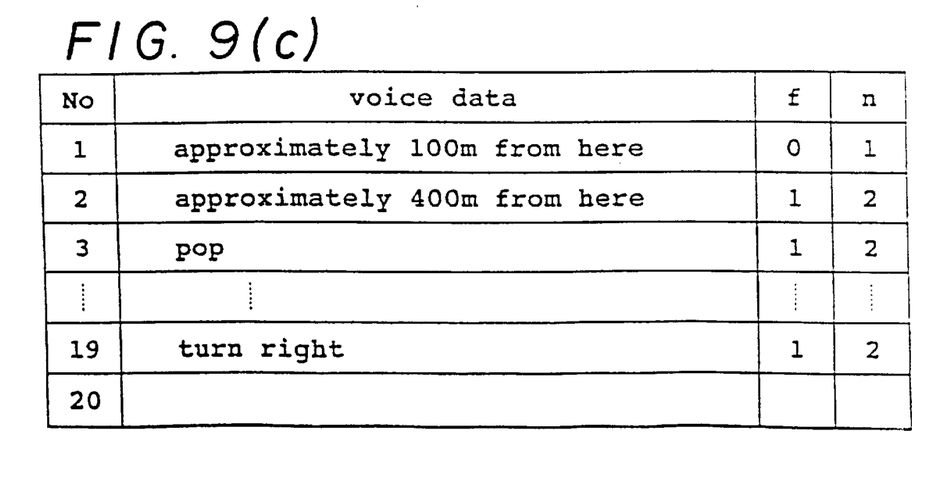
Figure 9D:
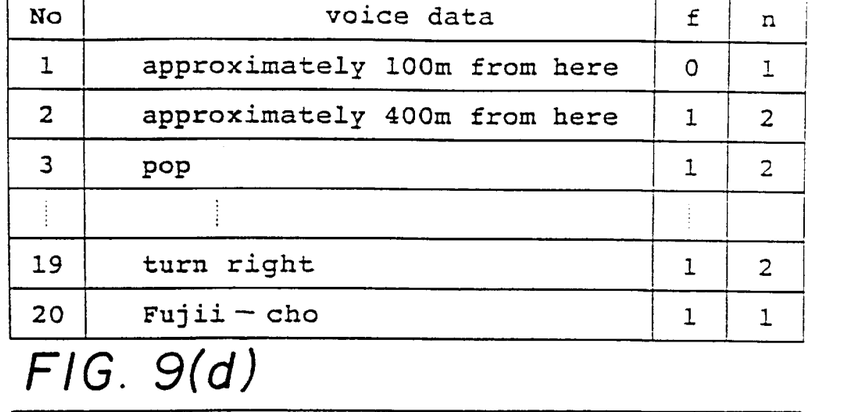
Figure 9E:
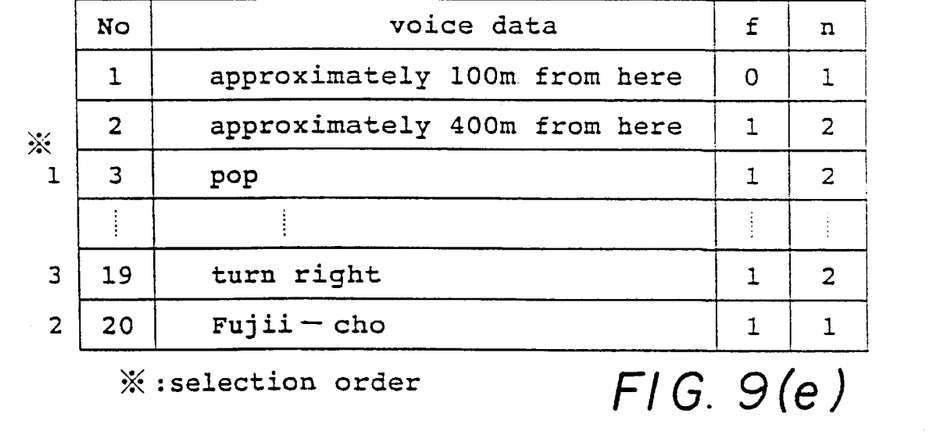
Figure 9F:
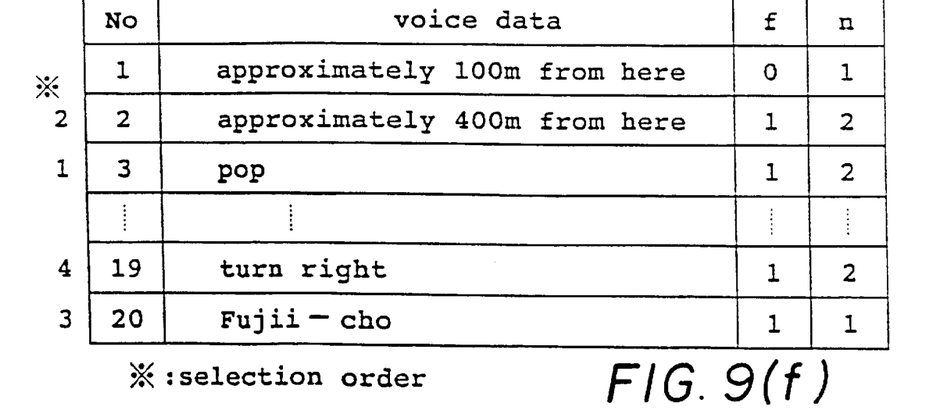

FIGS. 6 to 8 show flow charts of voice response processing executed in the navigation apparatus in accordance with this second embodiment. FIG. 9 shows the content of the voice buffer 4-1 used in this voice response processing. By way of example, the voice buffer 4-1 has a storing capacity of 20 phrases. The content of the voice buffer 4-1 is basically the combination of a phrase corresponding to voice data, an existing flag f indicating that phrase is presently selected, and a frequency of use n indicating the frequency of use of each phrase.

The existing flag f is set to f=1 in the case where a phrase is presently selected and, to the contrary, is set to f=0 in the case where this phrase is not selected. In the example shown in FIG. 9(1), the frequency of use n is set to n=1 in each phrase being first buffered and all the existing flags f are set to f=0 since no phrase is selected.

When the arithmetic section 1 initiates its execution, as some of repeatedly used phrases are known, these frequently used phrases such as "approximately 100 mm", "turn right", "turn left" and the like which indicate the remaining distance and the advancing direction etc. are buffered in a plurality of voice buffers in advance in step S10. Then, in step S11, the frequency of use of this buffered phrase is set to "1".

Next, in step S12, proper guidance information phrases are constructed to include a remaining distance, a target object, and an advancing direction on the basis of the determined course and the present vehicle position. For example, respective phrases of "pop", "approximately 400 m from here", "at Fujii-cho" and "turn right" are selected as the guidance information phrases.

Subsequently, it is judged in step S13 whether or not the selected phrases are the same as previously. In the case where the selected phrases have not changed, it is next judged in step S18 whether or not the timing has come for the automatic voice response. On the other hand, in the case where the selected phrases are different from the previous phrases, the flags f in the buffers are all cleared (i.e. the existing flag f is set to f=0) in a step S14, so that previously selected phrases are erased.

The selected phrases are separated in step S15 into two groups, i.e. phrases already existing in the buffers and phrases not existing in the buffers. As the phrases already existing in the buffers should remain there and not be erased, the existing flags f of the guidance information phrases "approximately 400 m from here" and "turn right" are set to f=1 and their used frequencies n are increased by +1 to n=2, respectively, in step S16.

Next, it is judged in step S17 whether or not all the selected phrases exist in the buffer. If all the selected phrases exist in the buffer, the routine goes to step S18 to determine if the time has come for the automatic voice response.

If all or some of the selected phrases are missing from the buffers, step S24 checks whether or not there is any empty buffer. When there is no empty buffer, processing is initiated to provide an empty buffer. On the other hand, when there is an empty buffer, for example buffer No. 20 shown in FIG. 9(3) is currently empty, step S26 checks whether or not all the selected phrases can be stored in this buffer. That is, the size of this empty buffer is checked for sufficiency in step S26.

In the case where there is no empty buffer or in the case where the empty buffer does not have a sufficient size, frequencies of use of the phrases currently existing in the buffers are checked and some buffers occupied by less frequently used phrases are cleared in step S25. In other words, in determining the buffer to be erased, the frequency of use is taken into consideration. Normally, once the vehicle has passed a certain intersection, that same intersection name is seldom used again. Therefore, the buffer storing this intersection name is erased first.

When one buffer is cleared, the size of the cleared buffer is checked again in step S26. By repeating this routine, it becomes possible to prepare a buffer having a size accommodating the selected phrases.

When a buffer (for example, the buffer No. 20 shown in FIG. 9(4)) is newly prepared, the selected phrase "Fujii-cho" is buffered in this buffer and the existing flag f is set to "1", in step S28 and the frequency n of use is set to "+1" in step S29. Thereafter, step S30 checks whether or not there is any phrase to be buffered. If a phrase remains to be stored in a buffer, the processing is again repeated from the step S24.

When all the selected phrases are completely buffered, step S18 then checks if the timing has come for the automatic voice response. If the judgement in step S18 is NO, it is then judged in step S19 whether or not the driver has input a request for guidance information. If there is no driver's request, the processing returns to the step S12.

If there is any driver's request, as the buffers are filled with the phrases selected in the previous processing, phrases are selected in the order of the remaining distance, the target object, and the advancing direction, as shown in FIG. 9(5), in a step S20. Then, these selected phrases are successively read out from the buffer 4-1 and transformed into voice signals through the ADPCM decoder 4-2, and then outputted from the speaker 5, in a step S21. As the caution sound "pop" is not selected in the case where there is a driver's request, this feature provides the advantage that the driver can listen to the voice response without any time lag.

If the judgement in step S18 indicates that there is no driver's request, phrases are selected in the order of the caution sound, the remaining distance, the target object, and the direction of advance, as shown in FIG. 9(6), in step S22. Then, these selected phrases are successively read out from the buffer 4-1, transformed into voice signals through the ADPCM decoder 4-2, and then output from the speaker 5 in a step S23. In the case where the automatic voice response is provided, the caution sound "pop" is issued at the beginning, and then the voice response is provided so as to follow this caution sound.

As apparent from above-described explanation, in accordance with the present invention, the following functions and effects are enjoyed. (a) The control means automatically provides the guidance information in a form of the voice response. Therefore, the driver can listen to this automatically provided guidance information while attentive to driving safety. At the same time, the driver can request the guidance information anytime and anywhere he wants to know it, in order to listen to the voice response of the latest guidance information.

(b) This system directly accesses the phrases which are prepared in the buffers beforehand, without accessing the data base in response to the driver's request. Lag time between the driver's request and actual issuance of the voice response issued is extremely short. Therefore, the driver can drive the car safely, by being given the guidance information sufficiently in advance.

(c) Buffers always store the frequently used phrases, so that the CDROM is prevented from being accessed every time these frequently used phrases are selected. Therefore, it becomes possible to speed up overall processing.

(d) In the case where one buffer does not have sufficient size, the phrases are buffered separately in a plurality of buffers. Therefore, the real-time voice response of the guidance information can be realized by the smallest number of buffers. In other words, the buffers are most effectively utilized in accordance with the present invention.

What is claimed is:

1. A vehicle navigation apparatus, in which navigation guidance is provided to guide a driver of a vehicle along a predetermined route to a selected destination, comprising:

present position detecting means for detecting the present position of the vehicle;

information storing means for storing map information and guidance information;

route storing means for storing route information;

request means, responsive to an input by the driver, for generating a request signal for requesting a next guidance point on a current route;

guide point approach judging means for determining if the detected present position is at a guidance point on the current route and for automatically outputting a request signal for requesting information regarding the guidance point, in accordance with said determination;

control means for retrieving, responsive to a request signal, guidance information regarding a guidance point from said information storing means and processing the retrieved guidance information, on the basis of the detected current position and the route information stored in said route storing means, for determining whether the request signal has been generated automatically or by said request means and for cancelling, if it is determined that the guidance information has been requested by said request means, guidance currently being provided and providing the requested information regarding the next guidance point; and guidance output means for outputting, in voice form, the guidance information processed by said control means.

2. A navigation apparatus according to claim 1, wherein the guidance information regarding the guidance point is distance between the detected current position and the guidance point.

3. A navigation apparatus according to claim 1, wherein guidance information output responsive to the request signal from the request means is in a first format and guidance information output responsive to an automatic request is in a second format which is different from said first format.

4. A vehicle navigation apparatus in accordance with claim 1 wherein said guidance information is a description of an intersection.

5. A vehicle navigation apparatus in accordance with claim 4 wherein said guidance information further includes the distance from the detected present position to the described intersection and directions for guiding the vehicle through the described intersection.

6. A vehicle navigation apparatus in accordance with claim 1 wherein said guidance output means generates said voice by selecting and combining a plurality of phrases.

7. A vehicle navigation apparatus in accordance with claim 6 wherein each of said phrases includes a noun identifying a feature of the predetermined route.

8. A navigation apparatus that determines a route to a destination, traces the current position of a vehicle on the determined route and provides guidance information along the determined route in accordance with the current position, said navigation apparatus comprising:

information storing means for storing map information and guidance information that includes a plurality of separate voice phrases;

route storing means for storing route information;

control means for retrieving guidance information regarding a next guidance point from the information storing means and processing the retrieved guidance information, on the basis of the current position and the route information stored in the route storing means;

guidance information storing means for temporarily storing the guidance information retrieved by the control means separately for each voice phrase; and output means for outputting, in voice form, the guidance information processed by the control means;

wherein said control means retrieves guidance information separately for individual voice phrases from the information storing means and stores the retrieved guidance information in the guidance information storing means phrase by phrase.

9. A navigation apparatus according to claim 8, wherein the control means determines whether each of the voice phrases required for the guidance information regarding the next guidance point is stored in the guidance information storing means, and the control means retrieves from the information storing means only the voice phrases that are needed for the guidance information regarding the next guidance point but are not stored in the guidance information storing means, and stores in the guidance information storing means the voice phrases retrieved from the information storing means.

10. A navigation apparatus according to claim 9, wherein the control means includes comparing means for determining frequencies of use of individual voice phrases of the guidance information stored in the guidance information storing means, and wherein the control means updates the guidance information stored in the guidance information storing means on the basis of the determined frequencies of use of the individual voice phrases.

11. A navigation apparatus according to claim 8, wherein the control means includes comparing means for determining frequencies of use of individual voice phrases of the guidance information stored in the guidance information storing means, and wherein the control means updates the guidance information stored in the guidance information storing means on the basis of the determined frequencies of use of the individual voice phrases.

12. A navigation apparatus that determines a route to a destination, traces the current position of a vehicle on the determined route and provides guidance information along the determined route in accordance with the current position, said navigation apparatus comprising:

current position detecting means for detecting the current position of the vehicle;

information storing means for storing map information and guidance information that includes a plurality of separate voice phrases;

route storing means for storing route information;

request means for generating a request signal for requesting information regarding the next guidance point on a current route;

control means for retrieving, responsive to said request signal, guidance information regarding the next guidance point from the information storing means, for temporarily storing the retrieved guidance information, and for processing the guidance information, on the basis of the current position and the route information stored in the route storing means;

guidance information storing means for temporarily storing the guidance information retrieved by the control means separately for each voice phrase; and output means for outputting, in voice form, the guidance information processed by the control means;

wherein said control means retrieves guidance information separately for individual voice phrases from the information storing means and stores the retrieved guidance information into the guidance information storing means phrase by phrase, in accordance with changes in the detected current position and, responsive to a guidance request by the request means, retrieves voice phrases from the guidance information storing means and composes a piece of guidance information using the retrieved voice phrases.

13. A navigation apparatus according to claim 12, additionally comprising:

guide point approach judging means for determining if the detected present position is at a guidance point on the current route and for automatically outputting a request signal for requesting information regarding the guidance point, in accordance with said determination; and wherein the control means comprises means for determining whether the guidance information has been requested automatically or by said request means, and for cancelling, if it is determined that the guidance information has been requested by said request means, guidance currently being provided and providing the guidance requested by said request means.

14. A navigation apparatus according to claim 13, wherein guidance information output responsive to the request signal from the request means is in a first format and guidance information output responsive to an automatic request is in a second format which is different from said first format.

15. A navigation apparatus according to claim 14, wherein the control means determines whether each of the voice phrases required for the guidance information regarding the next guidance point is stored in the guidance information storing means, and the control means retrieves from the information storing means only the voice phrases that are needed for the guidance information regarding the next guidance point but are not stored in the guidance information storing means, and stores in the guidance information storing means the voice phrases retrieved from the information storing means.

16. A navigation apparatus according to claim 15, wherein the control means includes comparing means for determining frequencies of use of individual voice phrases of the guidance information stored in the guidance information storing means, and wherein the control means updates the guidance information stored in the guidance information storing means on the basis of the determined frequencies of use of the individual voice phrases.

17. A navigation apparatus according to claim 14, wherein the control means retrieves alert sound data from the guidance information storing means and combines the alert sound data with retrieved guidance information to form said second format.

18. A navigation apparatus according to claim 12, additionally comprising:

guide point approach judging means for determining if the detected current position is at a guidance point on the current route and for automatically outputting a request signal for requesting information regarding the guidance point, in accordance with said determination.

19. A navigation apparatus according to claim 18, wherein guidance information output responsive to the request signal from the request means is in a first format and guidance information output responsive to an automatic request is in a second format which is different from said first format.

20. A navigation apparatus according to claim 18, wherein the control means determines whether each of the voice phrases required for the guidance information regarding the next guidance point is stored in the guidance information storing means, and the control means retrieves from the information storing means only the voice phrases that are needed for the guidance information regarding the next guidance point but are not stored in the guidance information storing means, and stores in the guidance information storing means the voice phrases retrieved from the information storing means.

21. A navigation apparatus according to claim 18, wherein the control means includes comparing means for determining frequencies of use of individual voice phrases of the guidance information stored in the guidance information storing means, and wherein the control means updates the guidance information stored in the guidance information storing means on the basis of the determined frequencies of use of the individual voice phrases.

22. A navigation apparatus according to claim 18, wherein the control means retrieves alert sound data from the guidance information storing means and combines the alert sound data with retrieved guidance information to form said second format.

23. A vehicle navigation apparatus that determines a route to a destination, traces the current position of the vehicle on the determined route and provides guidance information along the determined route in accordance with the current position, said navigation apparatus comprising:

information storing means for storing map information and guidance information that includes a plurality of separate voice phrases;

route storing means for storing route information;

control means for retrieving guidance information regarding a next guidance point from said information storing means and processing the retrieved guidance information, on the basis of the current position and the route information stored in said route storing means;

guidance information storing means for temporarily storing the guidance information retrieved by said control means separately for each voice phrase; and output means for outputting, in voice form, the guidance information processed by said control means;

wherein said control means retrieves the guidance information phrase by phrase from said information storing means, stores the retrieved guidance information in said guidance information storing means, determines phrase by phrase whether or not the guidance information regarding the next guidance point is stored in said guidance information storing means, retrieves from said information storing means only those phrases determined not to be stored in said guidance information storing means, and stores the phrases retrieved from said information storing means in said guidance information storing means.

24. A vehicle navigation apparatus for guiding a vehicle along a current route comprising:

current position detection means for detecting a current position of the vehicle;

data memory means for storing map data and guidance data for forming guidance information pertaining to predetermined guide points along the current route;

route memory means for storing route data;

request means for generating, in response to an input by an occupant of the vehicle, a request signal for requesting guidance information as to a predetermined guide point located on the current route;

guide point arrival determination means for determining whether a currently detected present position corresponds to a guide point on the current route, and for automatically generating a request signal requesting guidance information pertaining to the guide point corresponding to the currently detected present position, responsive to a positive determination;

control means, responsive to receipt of a request signal, for searching through said data memory means to locate data corresponding to the requested guidance information, based on the route data stored in said route memory means and the current position as detected by said current position detection means, for processing the located data to provide the requested guidance information, and for determining whether the received request signal is from said request means or from said guide-point arrival determination means;

guidance output means for audibly outputting the guidance information processed by said control means; and wherein said control means causes said guidance output means to output the requested guidance information for a given guide point in a first form when the request signal is received from said request means and in a second form, different from said first form, when the request signal is received from said guide-point arrival determination means.

25. A navigation apparatus according to claim 24, wherein the guide information regarding the guide point is distance between the detected current position and the guide point.

26. A navigation apparatus according to claim 24 wherein said first form is the guidance information as processed by said control means and said second form is a combination of an alert sound and the guidance information as processed by said control means.

* * * * *